Aug. 15, 1944.    F. E. BEST    2,355,843
ROLLER BEARING
Filed Jan. 21, 1942    3 Sheets-Sheet 1
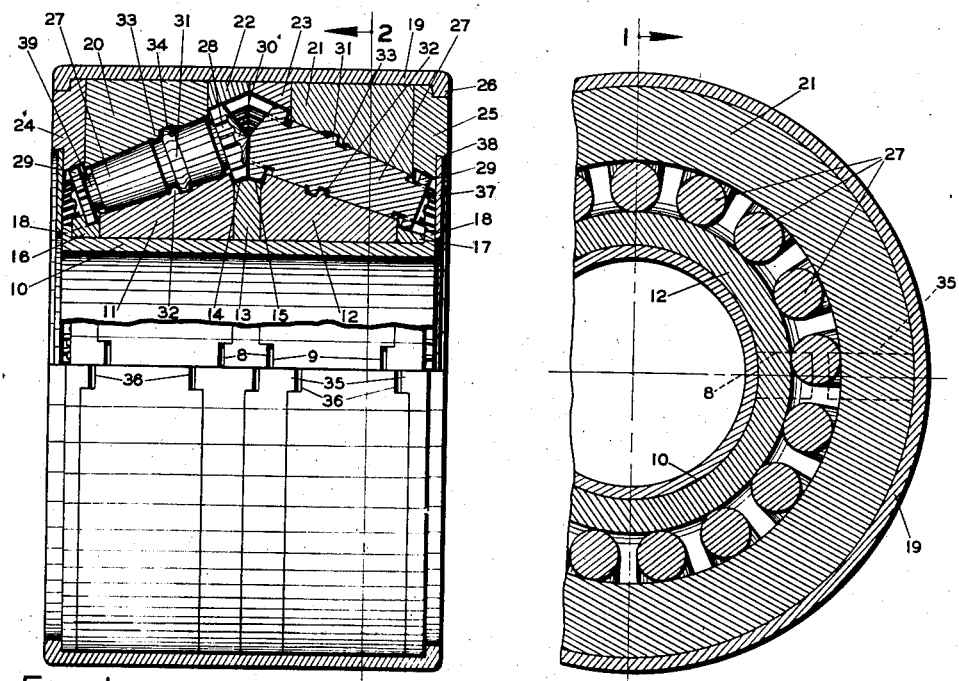
FIG. 1.
FIG. 2.
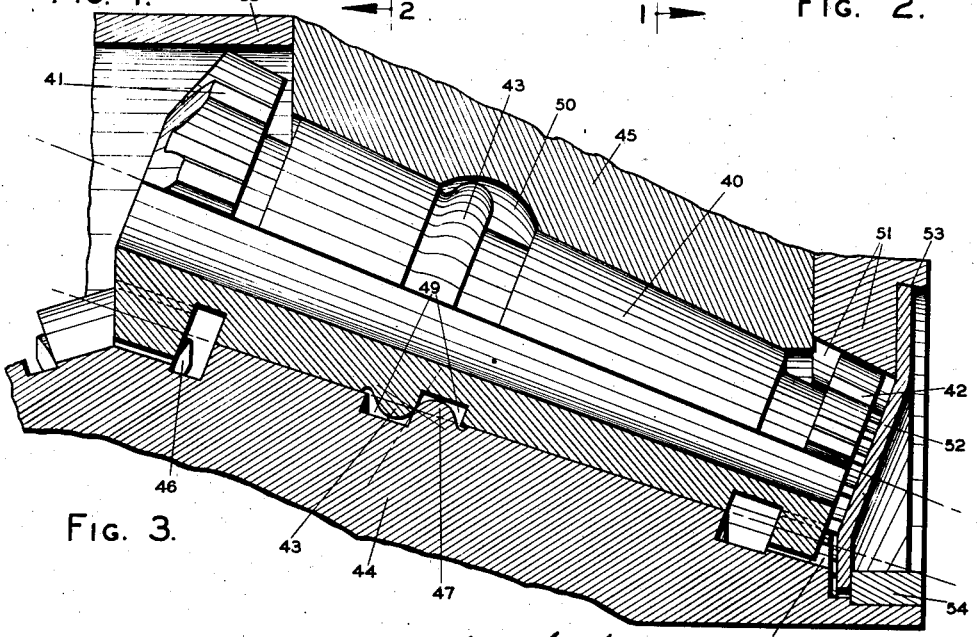
FIG. 3.
Frank Ellison Best,
INVENTOR Aug. 15, 1944.　　　　F. E. BEST　　　　2,355,843
ROLLER BEARING
Filed Jan. 21, 1942　　　3 Sheets-Sheet 3

INVENTOR.

Patented Aug. 15, 1944

2,355,843

UNITED STATES PATENT OFFICE 2,355,843

ROLLER BEARING

Frank Ellison Best, Indianapolis, Ind.

Application January 21, 1942, Serial No. 427,631

3 Claims. (Cl. 308—205)

This invention relates to roller bearings and the present invention is an improvement on the roller bearing disclosed in my United States Patent No. 2,285,800.

An object of this invention is improve the construction and increase the efficiency of a bearing of the type disclosed in my hereinbefore identified patent.

Another object is to provide a roller bearing of the type disclosed in my said prior patent comprising a plurality of generally circular race members and gear members assembled in end to end abutting relation and having interfitting tongue and groove means on their abutting end portions to lock said members against relative rotation and assure correct positioning of all of said members at all times.

Another object is to provide efficient cap means for use on a bearing of this type for excluding foreign substances from the bearing.

Another object is to provide an efficient method of and means for keeping a bearing of the type disclosed in my said prior patent clean and for excluding dirt, dust and liquid from said bearing by continuously forcing air under pressure through said bearing when the same is in operation, this method making it possible to operate the bearing while submerged without allowing liquid to enter the bearing.

Another object is to provide, in a bearing of this type, a more efficient interfitting flange means for preventing endwise movement of the rollers in the bearing.

Other objects will be apparent from the following description taken in connection with the accompanying drawings.

In the drawings Figure 1 is a sectional view taken substantially on broken line 1—1 of Fig. 2, parts being broken away and other parts being shown in elevation.

Fig. 2 is a fragmentary sectional view of the same taken on broken line 2—2 of Fig. 1.

Fig. 3 is a fragmentary view partly in section and partly in elevation of a bearing which differs from the bearing shown in Figs. 1 and 2.

Like reference numerals designate like parts throughout the several views.

Figure 4:
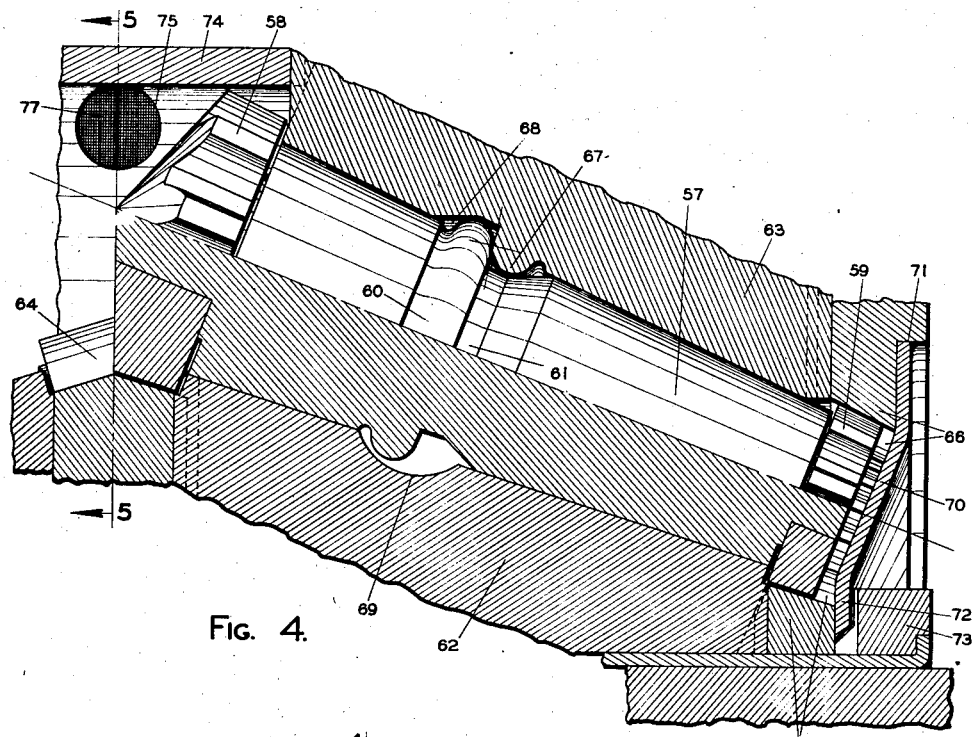
Fig. 4 is a fragmentary view partly in section and partly in elevation of another different type of roller bearing.

Figs. 1 and 2 show a combined radial and end thrust type roller bearing comprising a tubular center member 10 having two inner race members 11 and 12 secured thereon. A spacer member 13 is provided between the two race members 11 and 12. Two bevel gears 14 and 15 are provided on the peripheral portion of the spacer member 13. Two other bevel gears 16 and 17 in the form of rings are rigidly mounted on the tubular center member 10 at the respective ends of the race members 11 and 12.

The two race members 11 and 12, the spacer member 13, and the two bevel gears 14 and 15 are all locked together against relative rotary movement on the tubular center member 10 by interfitting tongue members 8 and grooves 9 provided in the abutting end portions of said members 11, 12, 13, 16 and 17. The tongues 8 and grooves 9 are shown by full lines in Fig. 1 and by dotted lines in Fig. 2. The ends 18 or the tubular center member 10 are expanded or turned outwardly, as shown in Fig. 1, so as to prevent endwise displacement and rotation of the parts 11, 12, 13, 14 and 15 as respects the tubular center member 10.

The outer portion of the bearing comprises an outer housing member 19 within which are two spaced apart outer race members 20 and 21, two medially disposed ring gear members 22 and 23 and two end ring gear members 24 and 25.

The ring gear members 22 and 23 are positioned between the inner ends of the two race members 20 and 21 and the end ring gear members 24 and 25 are positioned at the outer ends of the two race members 20 and 21. All of the outer race members and gear members 20 to 25 inclusive are non-rotatively connected with each other by interfitting tongues 35 and grooves 36, as shown by full lines in Fig. 1 and by broken lines in Fig. 2, and said members 20 to 25 are all fixedly secured within the housing 19 by crimping or bending the end portions 26 of the housing 19 inwardly against the outer ring gear members 24 and 25.

The outer surfaces of the inner race members 11 and 12 and the inner surfaces of the outer race members 20 and 21 are all of generally conical shape, as shown, and are spaced apart to provide two annular bearing chambers that are each wider at their inner ends and are adapted to receive a plurality of bearing rollers 27 of generally frustro-conical shape.

The rollers 27 are positioned in pairs with the two rollers of each pair positioned in the same axial plane of the bearing. The rollers 25 are tapered to conform to the taper of the chambers in which they are disposed and are positioned with their larger ends adjacent each other. Gear members 28, which may be either integral or separable, are provided on the larger end portions of the rollers 25 to mesh with the gears 14, 15, 22 and 23 and other gear members 29 are provided on the smaller end portions of the rollers 25 to mesh with the gears 16, 17, 24 and 25.

The pitch circles of the gears 28 and 29 would coincide with the conical surfaces of the rollers 27 if said conical surfaces were projected sufficiently beyond the ends of the rollers 27.

The gears 28 have cone shaped end portions 30 and the rollers 27 are arranged in pairs with the two cone shaped end portions 30 of each pair of rollers in contact with each other so that said conical end portions 30 will roll upon each other without sliding friction when the bearing is in use and will constitute the means for preventing endwise movement of the rollers in one direction. The contact of these end surfaces is substantially full and complete rolling contact thus substantially eliminating friction from this source.

To resist end thrust in an outward direction and to maintain end to end contact of the conical end portions 30 of the pairs of rollers each roller 27 is provided, intermediate its two ends, with an annular rib 31 that is herein shown to be positioned in engagement with two annular ribs 32 and 33, provided respectively on the inner race member 11 or 12 and on the outer race member 20 or 21. A groove 34 is provided adjacent each annular rib 31, 32 and 33 to accommodate the annular rib or ribs of a part or parts that make contact therewith.

The circular line of contact of the ribs 31, 32 and 33 coincides with the bearing surfaces of the rollers 27 and race members 11, 12, 20 and 21. For this reason the contact will be substantially complete rolling contact and will operate substantially without friction. The annular rib on each roller and each race member is positioned intermediate the two ends of the part on which it is formed to leave a bearing surface on each side of each rib.

Two caps 37 of duplicate construction, are provided at the ends of the bearing. Each cap 37 is in the form of a thin washer-shaped plate rigidly secured to one race member and having a relatively dust-proof moisture-proof running fit as respects the other race member.

In the drawings each cap 37 is shown to be shrink-fitted against an annular inclined shoulder 38 in the adjacent ring gear 24 or 25, and has its inner edge portion positioned in relatively light frictional contact with the adjacent outwardly bent end portion 18 of the tubular center member 10. When thus mounted the caps 37 will effectively exclude dust and almost all liquids and foreign substances that would damage the bearing.

When the gear members 28 and 29 are made integral with the rollers 27, as shown in Fig. 1, it is desirable for structural reasons to provide an annular groove 39 around each roller adjacent to each gear member. This facilitates the use of tools employed in cutting the gear teeth.

In assembling the bearing shown in Figs. 1 and 2 the inner race and gear members are preferably first assembled on the tubular member 10, the rollers 27 are then properly positioned on these parts, the outer ring gears and race members are then placed on the rollers and the outer housing member fitted over the entire assembly and secured in place by swedging the edges 26 inwardly. It is to be noted that the dotted lines in Fig. 1 show that the teeth of gear members 22 and 23 are beveled off so they will clear the points of largest diameter of the rollers 27 and may be passed thereover in assembling.

The rollers 27 are preferably constructed on a special machine which rolls each roller to an extremely accurate and precise dimension so that the conical ends 30 of two aligned rollers will always be in contact with each other and the rollers will always be in proper engagement with the races and the rib members 31, 32 and 33 in proper contact with each other.

In the operation of this roller bearing the rollers 27 carry the load, both radial and thrust, the ribs 31, 32 and 33 and conical end surfaces 30 prevent endwise displacement of the rollers and the gear members maintain proper spacing of the rollers and proper alignment of the axes of the rollers. The parts are accurately constructed and the bearing will operate at high speed and without lubrication. This makes the bearing suitable for use in extreme temperatures where lubrication is difficult or impossible.

In Figs. 1 and 2 I have shown the bearing rollers 27 to be operatively disposed in mesh with four gear members 16, 17, 24 and 25 that are rigid with the race members. Also I have shown the annular ribs 31 on each roller 27 to be engaged with two annular ribs 32 and 33 on the inner and outer race members respectively. However, correct alignment and spacing of the rollers 27 can be obtained by meshing said rollers 27 with only three gears on the race members and correct end positioning of the rollers can be obtained by engagement of the annular rib 31 of each roller with only one flange 32 or 33 on either the inner or the outer race member. Fig. 3 shows a structure which provides only three gear members on the races and only one rib on the races for engagement by the rib of each roller.

Fig. 3 shows a fragment of a bearing comprising a hollow or tubular roller 40 provided with gear members 41 and 42, and an annular rib 43. The roller 40 is of substantially the same external shape as the rollers 27 and is operatively associated with an inner race member 44 and outer race member 45.

The inner race member 44, as shown in Fig. 3, is of one piece construction and has medially positioned gear means 46 meshing with the gear 41 on the inner end portion of the rollers 40. Also the inner race member 44, shown in Fig. 3, has a rib 47 positioned to engage with the rib 43 of the roller 40 and has a gear 48 meshing with the end gear 42 of the roller 40.

Suitable annular clearance grooves 49 are provided alongside of the ribs 43 and 47 and the outer race member 45 has a large annular groove 50 to provide clearance for the rib 43 on the roller 40 but does not have any rib member for cooperation with said rib 43.

A ring gear 51 is secured to the outer end portion of the outer race member 45 and meshes with the gear 42.

A cap 52 is shrink fitted against an inclined shoulder 53 of the ring gear 51 and the inner edge portion of said cap 52 is lightly engaged by the end of a collar 54 that is press-fitted or otherwise fixedly secured to the end portion of the inner race member 44.

A spacer ring 55 is provided in the structure shown in Fig. 3 and takes the place of the ring gears 22 and 23 shown in Fig. 1. The other, or left hand, side of the bearing of Fig. 3 is a duplicate of the right hand side therein shown.

In the bearing shown in Fig. 3 the three gears 46, 48 and 51 maintain proper alignment and spacing of the rollers and the ribs 43 and 47 prevent endwise movement of the rollers in one direction while the cone shaped end portion of the gear 41 on the end of each roller 40 abuts against a similarly shaped end of a corresponding gear of a mating roller, not shown, and prevents endwise movement of the roller in the opposite direction. Obviously any three gear members on the races that properly mesh with the two gear members on the rollers will maintain proper alignment and spacing of the rollers.

The rollers 40, being tubular, have enough resiliency so that they may be assembled under some pressure thus doing away with all lost motion in the bearing.

The operation of the bearing shown in Fig. 3 is similar to the operation of the bearing shown in Figs. 1 and 2 herein described.

Figure 5:
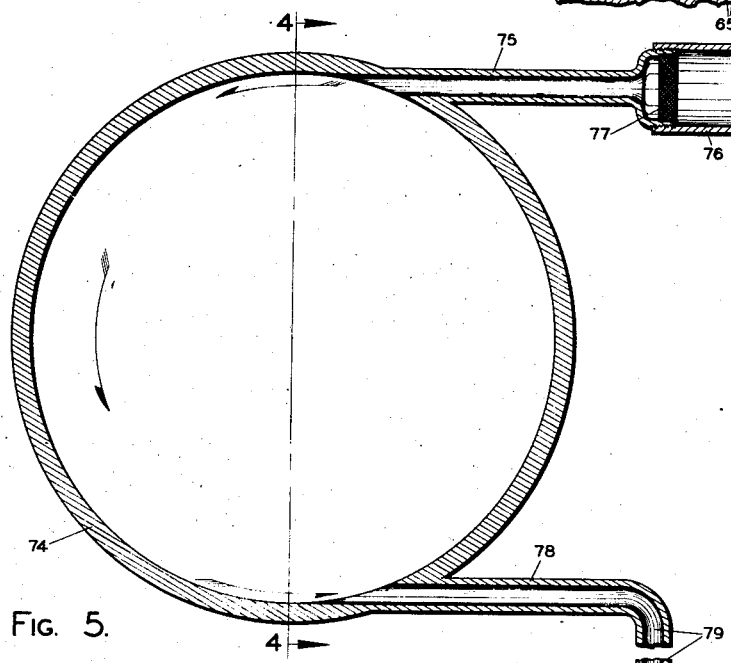
Fig. 5 is a sectional view taken on broken line 5—5 of Fig. 4 and on a smaller scale than Fig. 4, showing a housing ring of a bearing, the bearing parts within said housing being omitted.

Figs. 4 and 5 disclose a bearing comprising rollers 57, only one of which is shown. Each roller 57 is provided with two end gears 58 and 59 and has an intermediate rib 60, and adjacent groove 61.

The rollers 57 are positioned between inner race means 62 and outer race means 63. The gears 58 and 59 mesh with gear members 64, 65 and 66. Fig. 4, shows the gear members 64, 65 and 66 to be in the form of three separate ring members corresponding to the ring members 16, 17 and 25 of Fig. 1. Obviously the ring members 64 and 65 may be constructed integrally with the inner race member 62 in accordance with the teachings of Fig. 3.

The outer race means 63 is provided with an annular rib 67 and an adjacent annular groove 68 for cooperation with annular ribs 60 and grooves 61 of the rollers 57 to limit endwise movement of the rollers 57 toward the ends of the bearing. An annular groove 69 in the inner race member 62 provides clearance for the rib 60.

A cap 70 is preferably shrink-fitted against a shoulder 71 of the ring gear member 66. The inner annular portion 72 of the cap 70 is positioned between the gear member 65 and a collar 73 and preferably is fitted to the member 65 closely enough to exclude solids or liquids that tend to enter from the outside. The cap 70 will flex enough to permit the escape of air from the bearing past the inner portion 72 of the cap. It is to be noted that the cap 70 is slightly resilient and can be moved outwardly a slight distance from the member 65 but the structure of the collar 73 is such that the cap member 72 can not be caused to seal against said collar.

A cylindrical shell or housing 74 is provided between the innermost end of the outer race member 63, shown in Fig. 4, and the adjacent end of the corresponding race member, not shown, on the other side of the bearing. An air inlet conduit 75 communicates with the ring 74 and is positioned to deliver air substantially tangentially thereinto. A conduit 76 of larger diameter than the conduit 75 is connected with said conduit 75. A screen 77 is provided in the conduit 76 to exclude and strain out all particles of dust and solid matter from air that is entering the bearing housing. The smaller conduit 76 serves as a nozzle to speed up the velocity of air entering the ring 74.

An outlet conduit 78 for particles of solid matter is connected with the ring 74. The outlet conduit 78 is preferably substantially tangential to the ring 74 at its point of connection therewith and is preferably connected with the lowermost portion of the ring 74. The outer end portion of said outlet conduit 78 is preferably bent downwardly to form a dirt trap 79 and is provided with a cap 80 which may be removed for cleaning the trap 79.

The bearing shown in Figs. 4 and 5 is designed to operate without lubrication and its operation is similar to the operation of the bearings shown in Figs. 1, 2 and 3 in all respects except as regards the air circulation means.

In the operation of the air circulation means air, preferably under some pressure, is admitted through conduit means 75. This air follows a circular course in the ring 74, as shown by the arrows in Fig. 5, and passes outwardly between and around the rollers 57 to the ends of the bearing and escapes past the annular edge portion 72 of the dust guard member. This makes it possible to maintain a continuous circulation of air through the bearing for the purpose of keeping the bearing clean and for the purpose of preventing liquid from entering at the ends of the bearing between the parts 72 and 65 in the event the bearing is to be operated under conditions that require it to be immersed or submerged in liquid.

Any particles of dirt or solid matter that are caught in the whirling air in the ring member 74 will be caused, by centrifugal force, to follow around the peripheral wall of said ring member and will eventually find their way into the dirt trap 78, 79 from which they may be removed.

Figure 6:
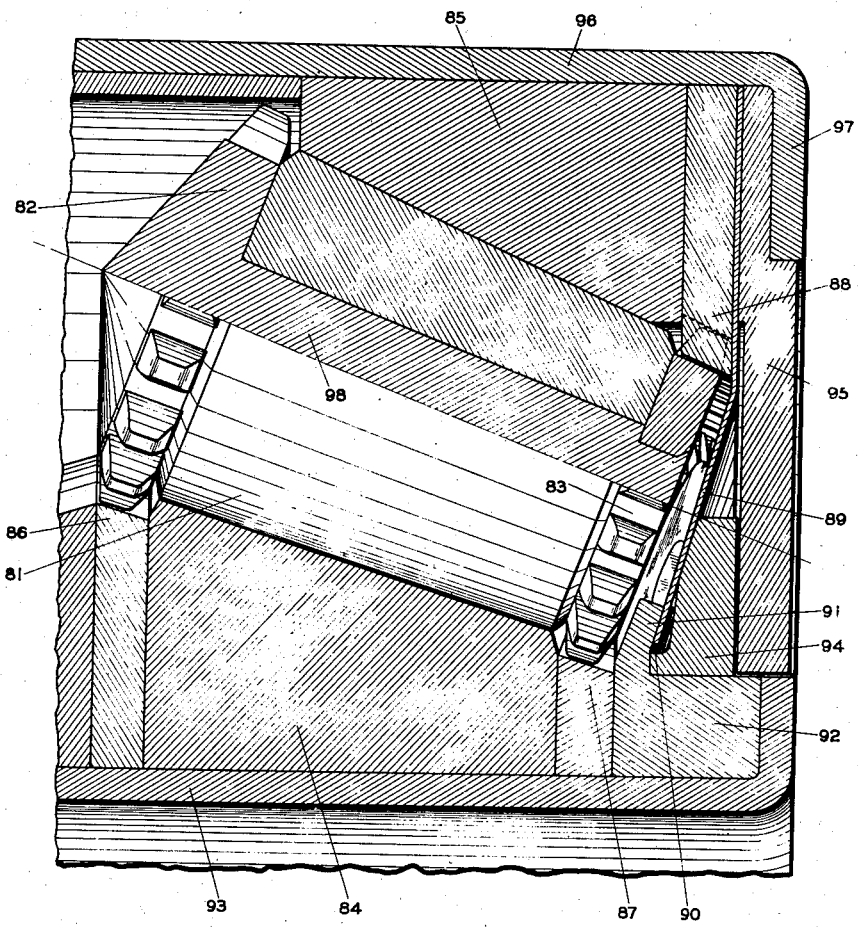
Fig. 6 is a fragmentary view partly in section and partly in elevation of another type of roller bearing constructed in accordance with this invention.

Fig. 6 shows a fragment of another roller bearing constructed in accordance with this invention in which the ribs for preventing endwise movement of the rollers toward the outer ends of the bearing are omitted and the taper of the rollers and race members is relied on to prevent such outward displacement of the rollers.

Fig. 6 shows a bearing roller 81 having gear members 82 and 83 on the end portions thereof. The roller 81 is positioned between an inner race member 84 and an outer race member 85. The gear members 82 and 83 mesh with gear means 86, 87 and 88 on the inner and outer race members.

A dust cap 89 is provided at the outer end of the bearing shown in Fig. 6. The innermost annular portion 90 of this cap 89 engages with an annular flange 91 of a collar 92 that is secured on an inner housing member 93. A ring member 94 is secured, preferably by press-fit or shrink-fit methods, on the collar 92. The cap 89, as shown in Fig. 6, is clamped between the outer race member 85 and an end plate 95. A shell or housing 96 supports the outer race members 85 and outer gear members 88 and has its end portion 97 clamped or clinched over the end plate 95 thereby completing the assembly.

Only a fragment of the upper right hand side of the bearing is shown in Fig. 6, but it will be understood that the left hand side thereof is of duplicate construction.

Fig. 6 shows the gear member 82 as made integral with a shank 98 that extends through the roller 81 and is secured to the separable gear member 83. When this construction is used it will be understood that all of these parts are rigid relative to each other and will rotate as a unit in the finished bearing.

The operation of the bearing shown in Fig. 6 is the same as the operation of the bearings shown in the preceding figures except that endwise movement of the rollers toward the outer sides of the bearing is prevented by the taper of the rollers and race members and the interfitting annular ribs on the rollers and race members are dispensed with.

I have herein disclosed certain preferred embodiments of my invention but it will be understood that changes may be made within the scope and spirit of the following claims.

Having described my invention, what I claim and desire to protect by Letters Patent is:

1. A geared roller bearing in which the rollers are geared to the bearing housing and race means, comprising an inner cylindrical member, a number of race members and a number of gear members on said inner cylindrical member, interfitting tongue and groove means in the abutting end portions of said race members and said gear members, means holding all of said race members and gear members in end to end abutting relation on said tubular member; an outer cylindrical member, a number of race members and a number of gear members within said outer cylindrical member, interfitting tongue and groove means in the abutting end portions of said last named race members and gear members, and means holding all of said last named race members and gear members in end to end abutting relation in said outer cylindrical member.

2. A geared roller bearing comprising a race member, two spaced apart gear members positioned in abutting relation to the respective end portions of said race member, interfitting tongue and groove means on the abutting portions of said race member and said gear members whereby correct relative alignment of the two spaced apart gear members is compelled, means supporting said race member and said gear members in abutting relation, rollers positioned for rolling engagement with said race member, and two gearwheels rigid with the respective end portions of each roller and meshing with said spaced apart accurately aligned gear members whereby said rollers are maintained in accurate alignment during operation.

3. A roller bearing comprising an inner cylindrical member, a plurality of alternately positioned inner race members and gear members supported on said inner cylindrical member with a gear member positioned at each end of each race member, interfitting tongue and groove means in the abutting end portions of said inner race members and gear members holding the two gear members at opposite ends of each race member in accurate alignment, means securing all of said inner race members and gear members together in end to end abutting relation on said inner cylindrical member, an outer cylindrical member, a plurality of alternately positioned outer race members and gear members supported within said outer cylindrical member with a gear member positioned at each end of each race member, interfitting tongue and groove means in the abutting end portions of said outer race members and gear members holding the two outer gear members at opposite ends of each race member in accurate alignment with each other, means securing all of said outer race members and gear members together in end to end abutting relation, rollers operatively disposed between said inner and outer race members, and two gearwheels rigid with the respective end portions of each roller and meshing with said spaced apart accurately aligned inner and outer gear members whereby said rollers are maintained in accurate alignment.

FRANK ELLISON BEST.